United States Patent [19]

Endoh

[11] Patent Number: 5,084,853
[45] Date of Patent: Jan. 28, 1992

[54] SPRING LOADED FLYWHEEL CLEANING APPARATUS FOR A PICK UP LENS OF A COMPACT DISC PLAYER

[75] Inventor: Hirotaka Endoh, Tokorozawa, Japan

[73] Assignee: Kyowa Sonic Co., Ltd., Japan

[21] Appl. No.: 482,501

[22] Filed: Feb. 21, 1990

[30] Foreign Application Priority Data

Mar. 7, 1989 [JP] Japan .................. 1-25771[U]

[51] Int. Cl.⁵ .................... G11B 7/12; G11B 33/00
[52] U.S. Cl. .................................. 369/71; 369/72; 369/292
[58] Field of Search ............ 369/71, 72, 73, 74; 360/128, 137

[56] References Cited

U.S. PATENT DOCUMENTS

| 4,464,742 | 8/1984 | Brauer | 369/71 |
| 4,817,078 | 3/1989 | Iwata | 369/71 |

FOREIGN PATENT DOCUMENTS

| 61-236041 | 10/1986 | Japan | 369/71 |
| 63-136371 | 6/1988 | Japan | 369/71 |
| 63-244467 | 10/1988 | Japan | 369/71 |

Primary Examiner—Stuart S. Levy
Assistant Examiner—Kenneth B. Wells
Attorney, Agent, or Firm—Stevens, Davis, Miller & Mosher

[57] ABSTRACT

A cleaning apparatus for a pick-up lens of a compact disc player using a front loading base in which a flywheel is fixed to the axle of the cleaning brush. The flywheel is placed in rotation by the release of a compressed spring.

1 Claim, 8 Drawing Sheets

SPRING LOADED FLYWHEEL CLEANING APPARATUS FOR A PICK UP LENS OF A COMPACT DISC PLAYER

FIELD OF THE INVENTION

The present invention relates to a cleaning apparatus for a pick up lens of a compact disc using a front loading base to carry a compact disc record.

BACKGROUND OF THE INVENTION

A prior art cleaning apparatus for a pick up lens of a compact disc player using a front base to carry the compact disc record is shown in U.S. Pat. No. 4,817,078.

In the prior art, the pick up lens cleaner operates as follows.

a; First, a driving gear is rotated, so a spiral spring attached to the driving gear is wound to store energy for reverse-rotation of the driving gear.

b; when the pick up lens cleaner is inserted into a compact disc player body, a stop release spring on the cleaner housing is pushed by an arm of the player body. Then, the driving gear is released from having been stopped from reverse rotation.

c; When the driving gear starts to rotate in force because of the stored energy from the wound spiral spring, a pick up lens cleaner brush starts to rotate. Then, a planet gear is used as a transmitting gear.

In the prior art, the rotational force of the cleaner brush relies entirely on the stored energy from the wound spiral spring, the diameter of the spiral spring being too big while the construction of the cleaner is so complicated.

SUMMARY OF THE INVENTION

For solving the problem of the prior art, the pick up lens cleaner has the following construction for simplifying and rendering smaller the pick up lens cleaner.

a; The pick up lens of the present invention uses a sector gear as a driving gear.

b; A fly wheel is attached to a transmitting gear rotating with a cleaning brush.

The pick up lens cleaner of the present invention operates as follows.

First, the pick up lens cleaner brush rotates in force as a result of the stored energy of the spiral spring. The function of the cleaner at this point is the same as that of the prior art. Second, the cleaner brush rotates in force as a result of inertia of the fly wheel attached to the cleaner brush itself.

The pick up lens cleaner of the present invention is small-sized and simplified in comparison with the prior art, because inertia of the fly wheel is used as a rotating force for the pick up lens cleaner brush.

BRIEF DESCRIPTION OF THE SEVERAL VIEWS OF THE DRAWINGS

FIG. 8 $a,b,c,d,e$, shows function of a driving gear and transmitting gear.

DETAILED DESCRIPTION OF THE PREFERRED EMBODIMENT

The present invention relates to a cleaning apparatus for cleaning a pick up lens of a compact disc using a front loading base.

The cleaner of the present invention includes the following elements in its housing 1 enclosed by a cover 2.

Figure 1:
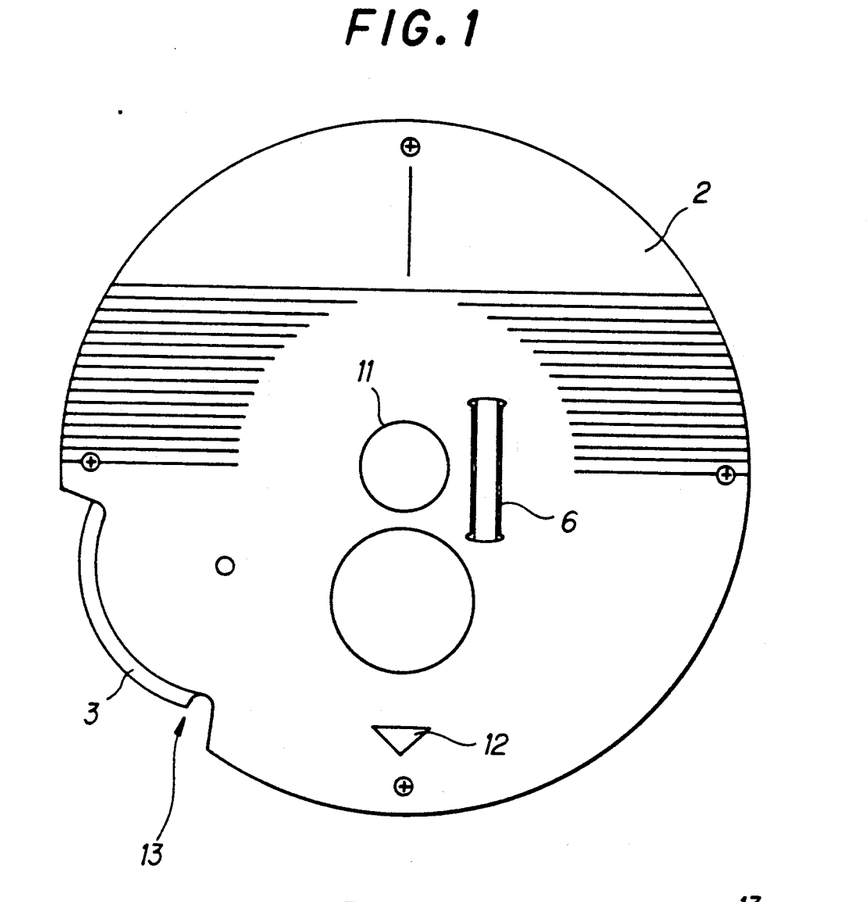
FIG. 1 shows a cleaner body in a plan view.
Figure 2:
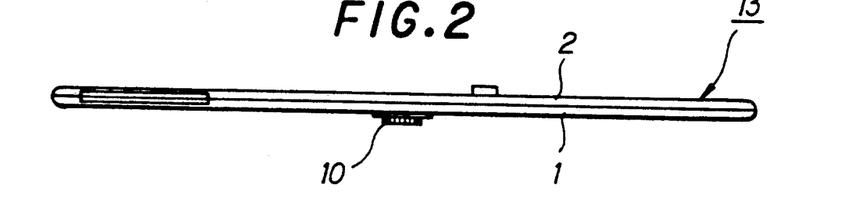
FIG. 2 shows a cleaner body in a side view.
Figure 3:
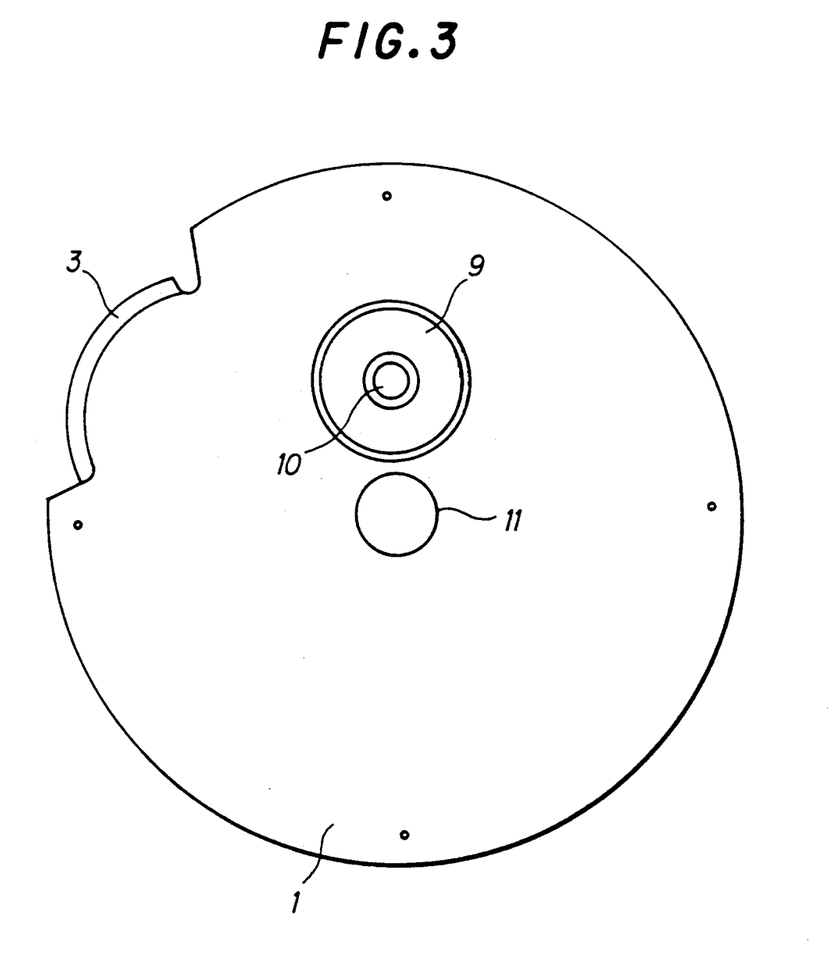
FIG. 3 shows a cleaner body in a botton view.
Figure 4:
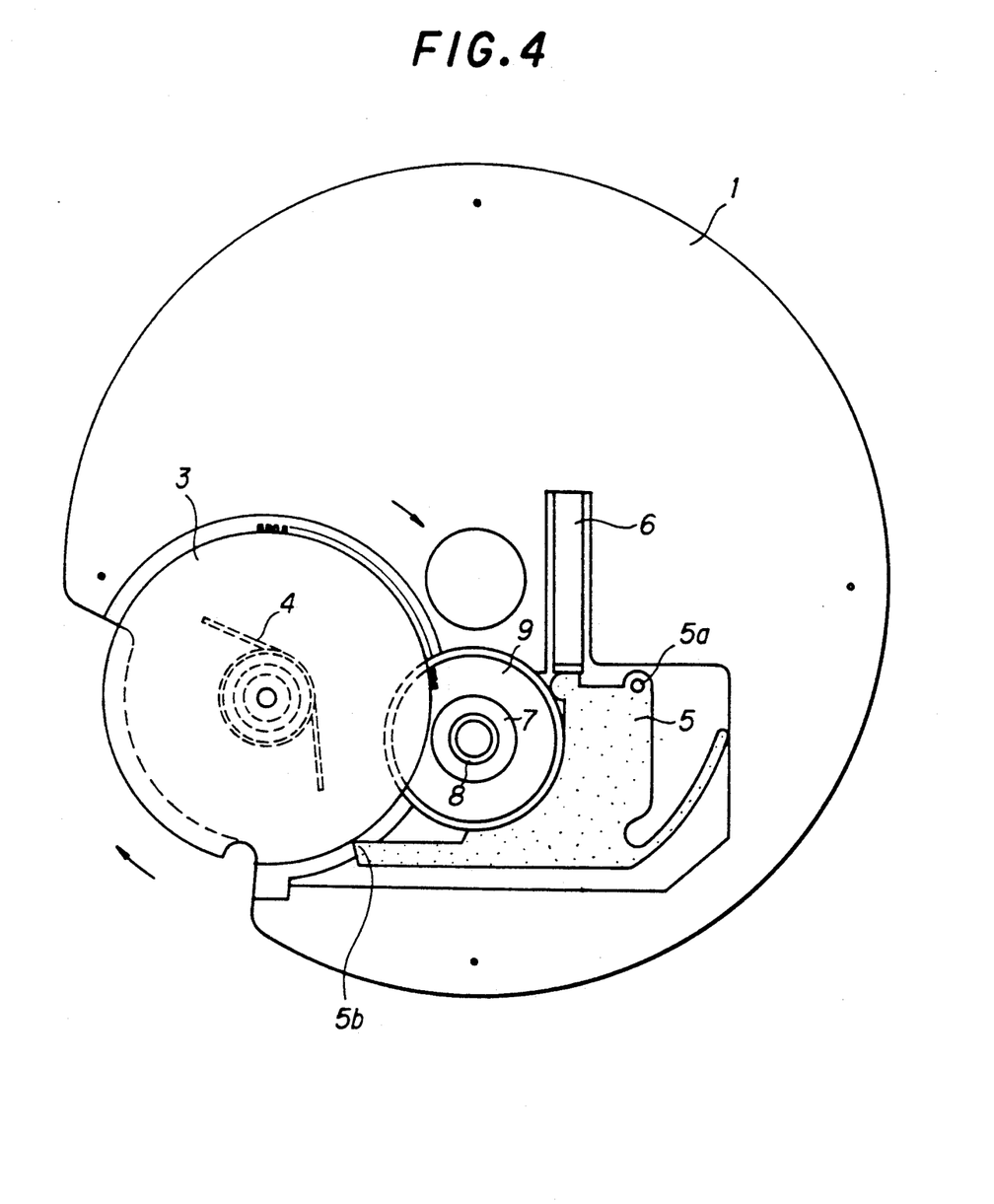
FIG. 4 shows a cleaner body in plan view with its cover off.
Figure 5:
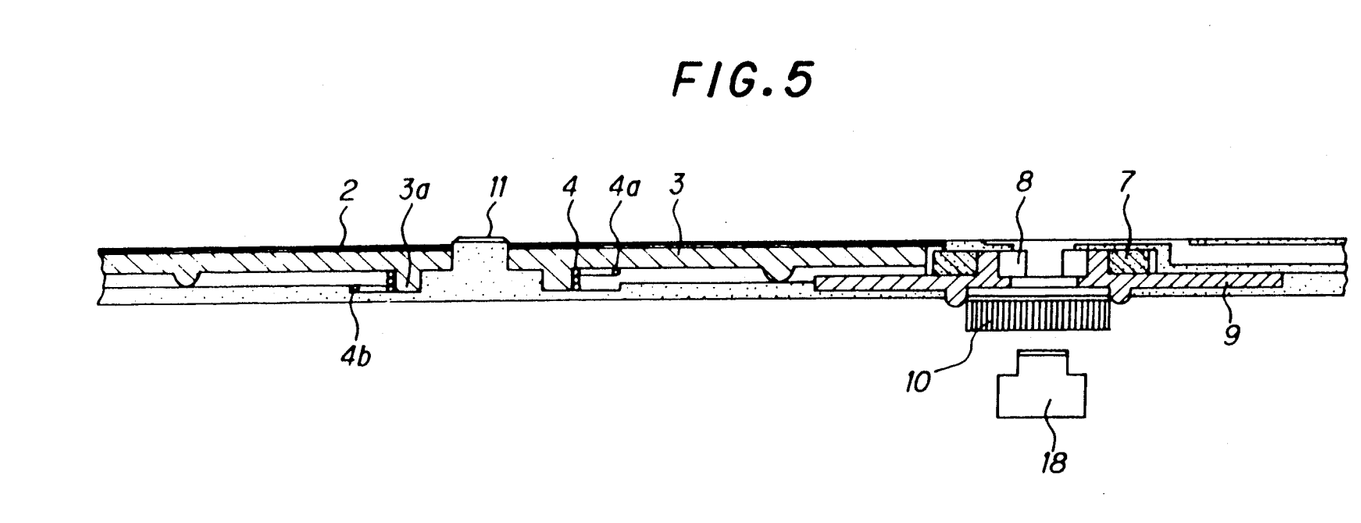
FIG. 5 shows a vertical sectional view including a driving gear, a transmitting gear, a fly wheel and a cleaner brush.
Figure 6:
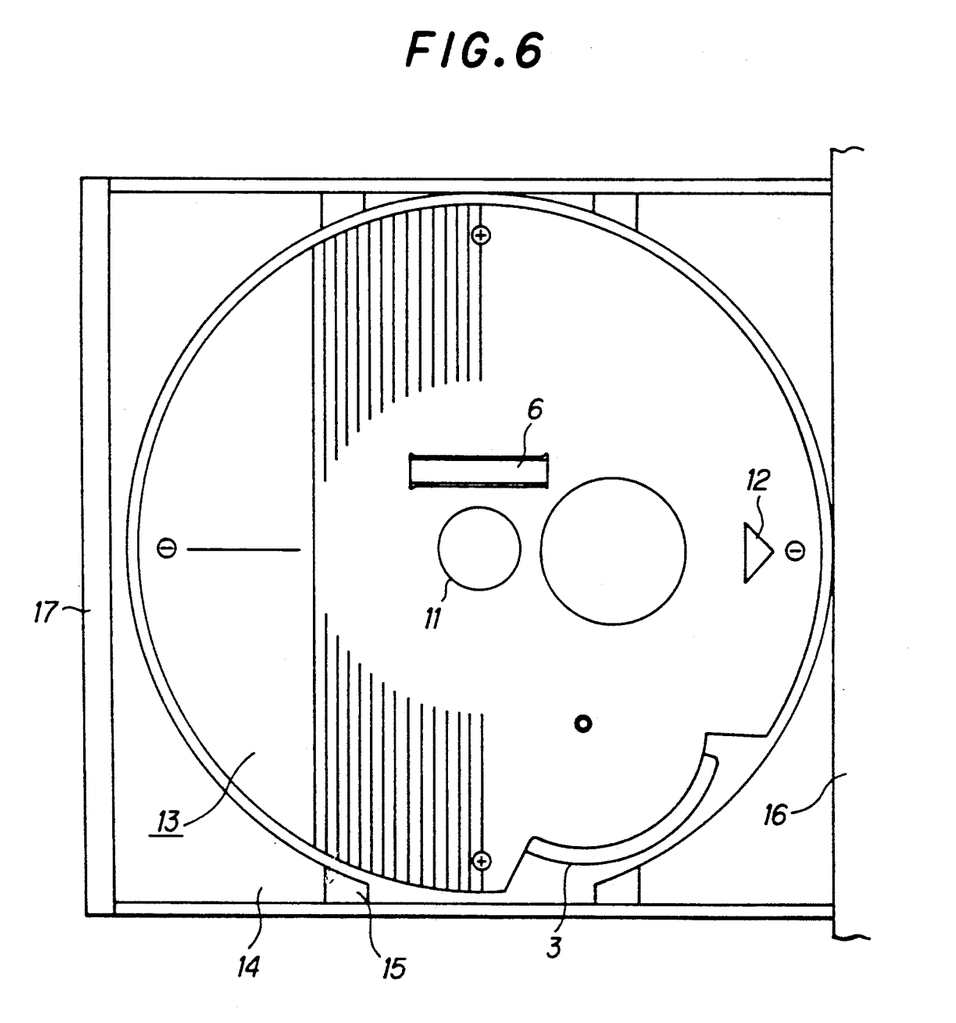
FIG. 6 shows a front loading base in a plan view.
Figure 7:
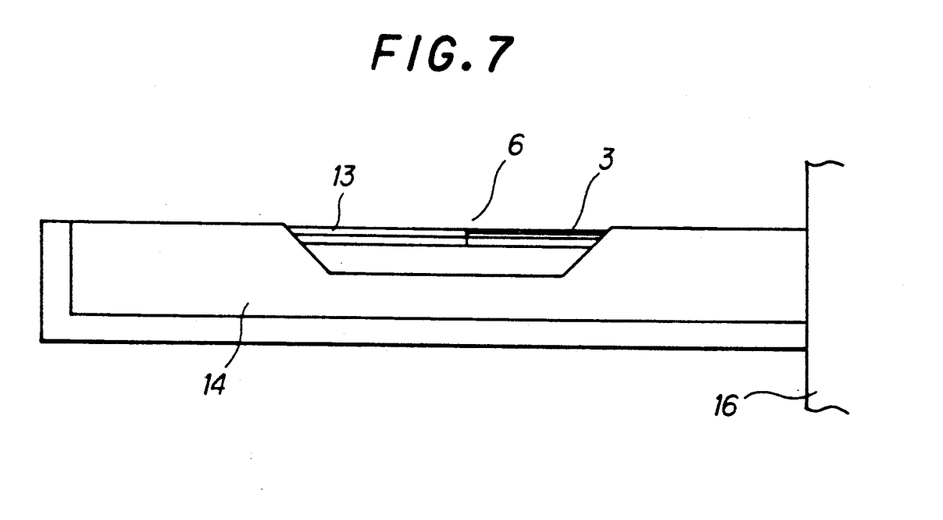
FIG. 7 shows the a front loading base in a side view.

A driving gear 3 formed as a sector gear;

A transmitting gear 7 engaged with the driving gear 3;

A fly wheel 9 concentrically fixed to the transmitting gear 7;

A spiral spring 4 wound about a ring-shaped projection 3a of the driving gear encircling a pivot 11 of the driving gear 3 with one end 4a of the spring being fixed to the back face and the other end 4b being fixed to the housing 1 as shown in FIG. 5;

A stopper 5 has its head end 5b engage the driving gear 3 to stop the reverse rotation of the the driving gear 3 from the winding up direction of the spiral spring 4;

a stop release spring 6 projects from the cover 2 of the housing 1;

A cleaner brush concentrically attached to the fly wheel 9;

In FIGS. 4 and 5, 8 is a bearing for the fly wheel 9. In FIGS. 1 and 6, 12 is an arrow showing the location for the insertion of the front loading base 14, 13 is the pick up lens cleaner, 15 is a groove for removing a compact disc record from the front loading base 14 and 16 is a compact disc player body.

Operation of the pick up lens cleaner is as follows. The initial positions of the driving gear 3 and transmitting gear 7 are shown in FIG. 8a.

Figure 8A:
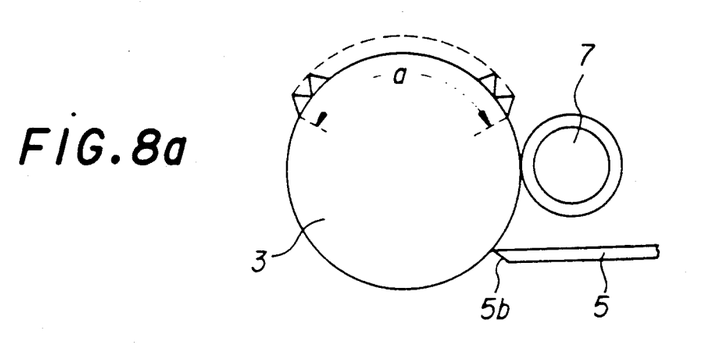

In FIG. 8a, teeth group a of the driving gear 3 is separated from transmitting gear 7 in an anti-clockwise direction from transmitting gear 7. In this position head end 5b of the stopper 5 is not in contact with the teeth group a.

In the condition of FIG. 8a, the driving gear 3 is wound in a clockwise direction of FIG. 8a. As a result thereof, the teeth group a engages with the transmitting gear 7 until the end of teeth group a in FIG. 8b almost no longer meshes with the transmitting gear 7. At this point the, winding up of torsion spring 4 is finished.

Figure 8B:
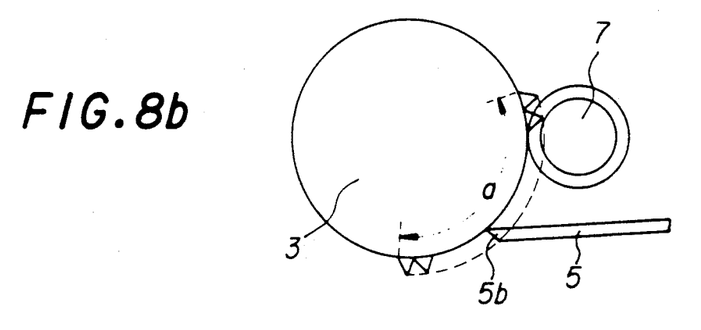

While the spiral spring 4 is being wound, the head end 5b of the stopper 5 engages with the teeth group a and prevents reverse-rotation of the driving gear 3.

In the condition of FIG. 8b, the cleaner body 13 is inserted into the player body 16, after which the stop release spring 6 is operated by an arm etc. (not shown in figures) of the player body 16. The stopper 5 then pivotally moves about the pivot 5a and its head end 5b separates from the teeth group a as shown in FIG. 8c.

Figure 8C:
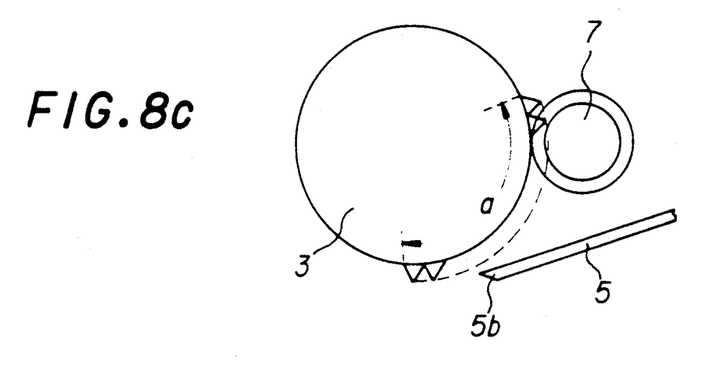
Figure 8D:
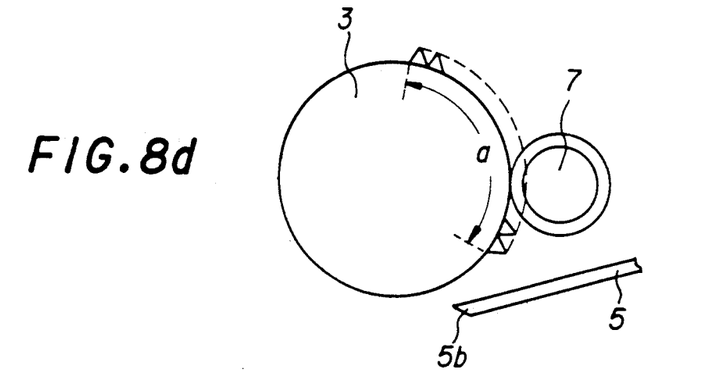

The driving gear 3 in FIG. 8c then rotates in an anti-clockwise direction due to the force of stored energy of the spiral spring 4.

Figure 8E:
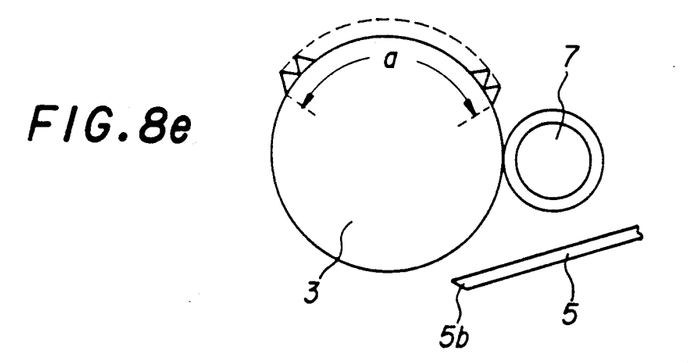

The teeth group a of the driving gear 3 finally rotates out of mesh with the transmitting gear 7 as shown in FIG. 8e. FIG. 8a and FIG. 8e are the same with respect to the position of gears 3 and 7.

At this moment, the transmitting gear 7 continues to rotate at high speed, because the teeth group a of the driving gear 3 and transmitting gear 7 attached to the fly wheel 9 continue to revolve at high speed due to the release of stored energy of spiral spring 4 wound while driving gear 3 and transmitting gear 7 engage with each other. After the teeth group a of the driving gear 3 rotates out of mesh with the teeth of the transmitting gear 7, the transmitting gear 7 continues to rotate because of the inertia of the fly wheel 9. Consequently, the cleaning brush 10 continues to revolve at high speed as a result of the fly wheel 9 and cleans the pick up lens 18.

What is claimed is:

1. A cleaning apparatus for a pick up lens of a compact disc player using a front loading base, comprising,
   a housing having size and shape similar to a compact disc record;
   a driving gear enclosed in said housing formed of a sector gear having a teeth group, wound by a spiral spring about its pivot;
   a transmitting gear intermittently engaging with said driving gear;
   a fly wheel concentrically attached to the transmitting gear;
   a cleaner brush for cleaning the pick up lens, concentrically revolving with said fly wheel;
   a stop having its head end engaging with said teeth group of the driving gear to prevent reverse rotation of the wound spiral spring;
   a stop release spring to release the head end of the stopper from engaging with the teeth group of the driving gear;
   said spiral spring being wound by rotating the driving gear and said teeth group of the driving gear engaged with the transmitting gear in condition that the transmitting gear is prevented from reverse-rotating said wound spiral spring by making the head end of the stop engage with the teeth group of the driving gear;
   said stop release spring releasing engagement of the teeth group of the driving gear and the head end of the stop;
   said driving gear, transmitting gear, fly wheel and cleaner brush starting to rotate upon releasing engagement of the teeth group and the head end of the stop; said cleaner brush initially rotating due to stored energy of the spiral spring, after which it rotates due to inertia of the fly wheel.

* * * * *